United States Patent [19]

Hall

[11] Patent Number: 5,217,176
[45] Date of Patent: Jun. 8, 1993

[54] APPARATUS FOR PROVIDING STRAIN RELIEF DURING RETRIEVING OF MARINE SEISMIC CABLES

[75] Inventor: Robert L. Hall, West Columbia, Tex.

[73] Assignee: Texaco Inc., White Plains, N.Y.

[21] Appl. No.: 672,994

[22] Filed: Mar. 21, 1991

[51] Int. Cl.⁵ .................. B65H 51/00; B65H 51/02
[52] U.S. Cl. ...................... 242/54 R; 242/47; 242/47.1; 242/47.12; 254/371; 254/417; 226/170
[58] Field of Search ............ 242/54 R, 155 BW, 47, 242/47.01, 47.08, 47.12; 254/371, 382, 417; 226/170, 173

[56] References Cited

U.S. PATENT DOCUMENTS

| | | | |
|---|---|---|---|
| 1,744,779 | 1/1930 | Massingham | 242/47.12 |
| 2,561,497 | 7/1951 | Clark et al. | 226/170 |
| 2,836,983 | 6/1958 | Stewart | 242/47.12 |
| 3,804,372 | 4/1974 | Fuchs | 254/417 |
| 4,090,675 | 5/1978 | Betla | 242/47 |
| 4,869,412 | 9/1989 | Bishop | 226/170 |

FOREIGN PATENT DOCUMENTS

| | | | |
|---|---|---|---|
| 964252 | 5/1957 | Fed. Rep. of Germany | 242/47.12 |
| 1323523 | 7/1987 | U.S.S.R. | 254/371 |
| 1148251 | 8/1989 | U.S.S.R. | 254/371 |
| 1152187 | 11/1989 | U.S.S.R. | 254/371 |
| 1175102 | 2/1990 | U.S.S.R. | 254/371 |
| 1198877 | 2/1990 | U.S.S.R. | 254/371 |

Primary Examiner—Daniel P. Stodola
Assistant Examiner—John Q. Nguyen
Attorney, Agent, or Firm—James L. Bailey; Jack H. Park; Russell J. Egan

[57] ABSTRACT

An apparatus for retrieving marine seismic cable uses an endless traction member which defines a helical path of at least two turns for pulling the cable in a uniform fashion without forming overlapping layers.

6 Claims, 3 Drawing Sheets

APPARATUS FOR PROVIDING STRAIN RELIEF DURING RETRIEVING OF MARINE SEISMIC CABLES

BACKGROUND OF THE INVENTION

1. The Field of the Invention

The present invention relates to a method and apparatus for deploying and recovering marine seismic cables and in particular to a method and apparatus which will substantially reduce cable tension in both hauling and reeling the cables thereby substantially eliminating the risk of cable damage.

2. The Prior Art

It has long been known that there are substantial petroleum deposits located beneath the sea and that it is necessary to determine the exact location of these deposits in order to commence recovery operations. Marine seismic exploration has become an accepted and standardized practice using a number of different approaches. The most popular seismic exploration method utilizes an explosive source and at least one cable of substantial length equipped with a plurality of spaced hydrophones, and other supporting transducers and electronics, adapted to detect reflected energy from the sea's subbottom's geologic anomalies. The cables are generally referred to as streamers and range in length from one to four miles with from one to four cables or streamers being pulled behind a single survey vessel.

Each cable or streamer is formed by a number of segments or elements, each a water-tight tube about 3 inches in diameter and approximately 150 feet in length. The outer cover or jacket can be a single extrusion or a builtup laminate including reinforcement materials. Each cable segment contains an array of electronic devices including hydrophones and/or transducers and rigid cylindrical protective cans in a spaced configuration with the residue of the interior of the segment being filled with a special oil for flotation purposes. Each segment is connected to the adjacent segment by a rigid cylindrical can which is approximately 4 ½ inches in diameter and 18 inches long. The total streamer will be an assembly of the above mentioned segments having an overall one to four mile length.

Each streamer is buoyant in that it will float unaided. Each streamer, while being rugged enough to withstand an ocean environment, is somewhat fragile in that it will not tolerate high line pulls or being wound under tension when stored. The previously mentioned cans and other internal blocks or spacers cause a particular problem when the cable is retrieved and/or stored in that, while the streamer is generally flexible, the blocks, spacers and cans are essentially rigid and therefore, will not tolerate being wound tightly either during recovery or in storage. The blocks, spacers and cans also cause a problem in that, if the streamer is wound too tightly, there is great danger of perforation of the outer cover by the sharp edges formed by the ends of these spacers, blocks and cans.

Normally, the cables are towed or streamed at about 5 mph, known as "shooting speed." This creates about 2500 ftlbs of tension on a 2 mile cable. Recovery of the cable necessarily increases tension on the cable and raises the possibility of damage. If only a single cable is deployed, then it is possible to back the vessel during the recovery operation thereby reducing tension. However, such a backing of the vessel is not possible when multiple cables have been deployed.

SUMMARY OF THE INVENTION

The present invention comprises a method and apparatus for deploying and retrieving marine seismic cables in such a manner as to limit the amount of tension and/or strain imparted to the cable. The subject invention has an endless traction means extending around the circumference of a drum at least once in a helix with said endless member being driven so that cable engaging the endless traction member will be pulled around the drum in convolution imparting controlled and limited strain to the cable.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
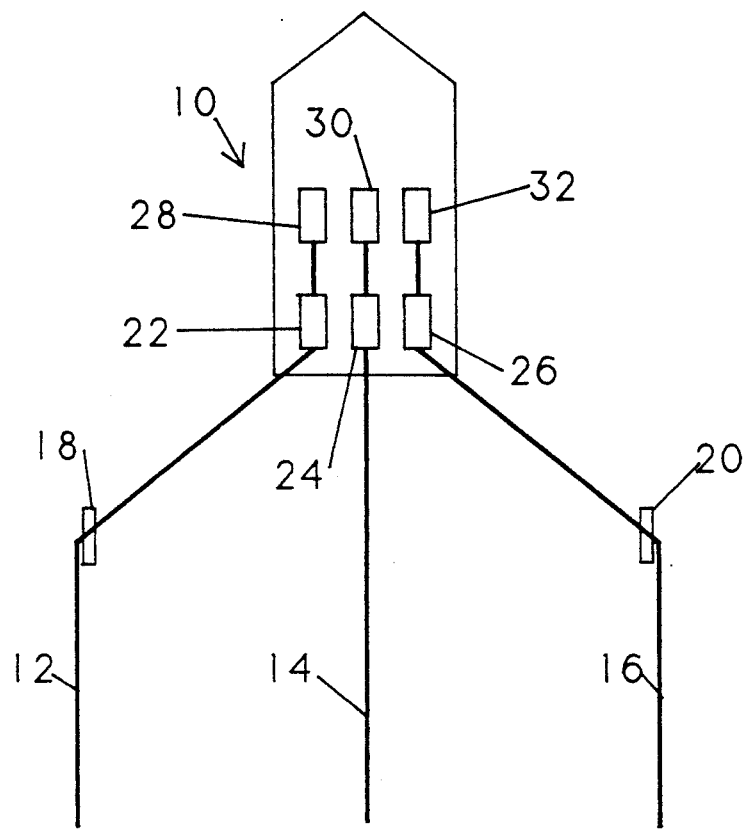
FIG. 1 is a schematic plan of a survey vessel towing three marine seismic cables.

FIG. 1 shows a fairly typical marine seismic surveying arrangement with vessel 10 streaming three cables 12,14,16 with the port and starboard cables 12 and 16 being positioned carried to an offset position by paravanes 18,20. Each cable is provided with a strain relieving cable recovery mechanism, 22,24,26, according to the present invention and a takeup storage reel 28,30,32. Each of the cables 12,14,16 is of the above-mentioned type made up of approximately 150 foot segments to a total length from one to four miles. Each segment having a water-tight outer sleeve or jacket and containing electronic equipment such as hydrophones and/or transducers, rigid protective cans and couplings and a fluid. The paravanes 18,20 are set to stream the port and starboard cables out a desired distance to each side of the path of the vessel 10.

Figure 2:
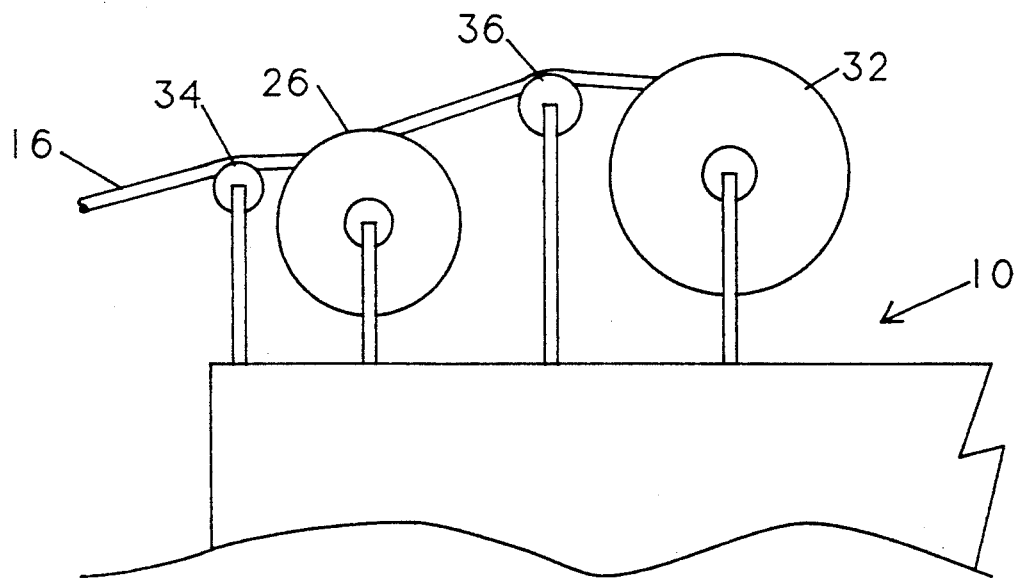
FIG. 2 is a side elevation of the stern portion only of the survey vessel showing the apparatus of the present invention together with guide means and takeup reel.

The starboard stern portion of the vessel 10 is shown schematically in FIG. 2. The starboard cable 16 is shown being recovered by the subject device 26 and wound on storage reel 32. Guide means 34,36 are provided to respectively guide the cable on to and off of the subject device 26.

Figure 3:
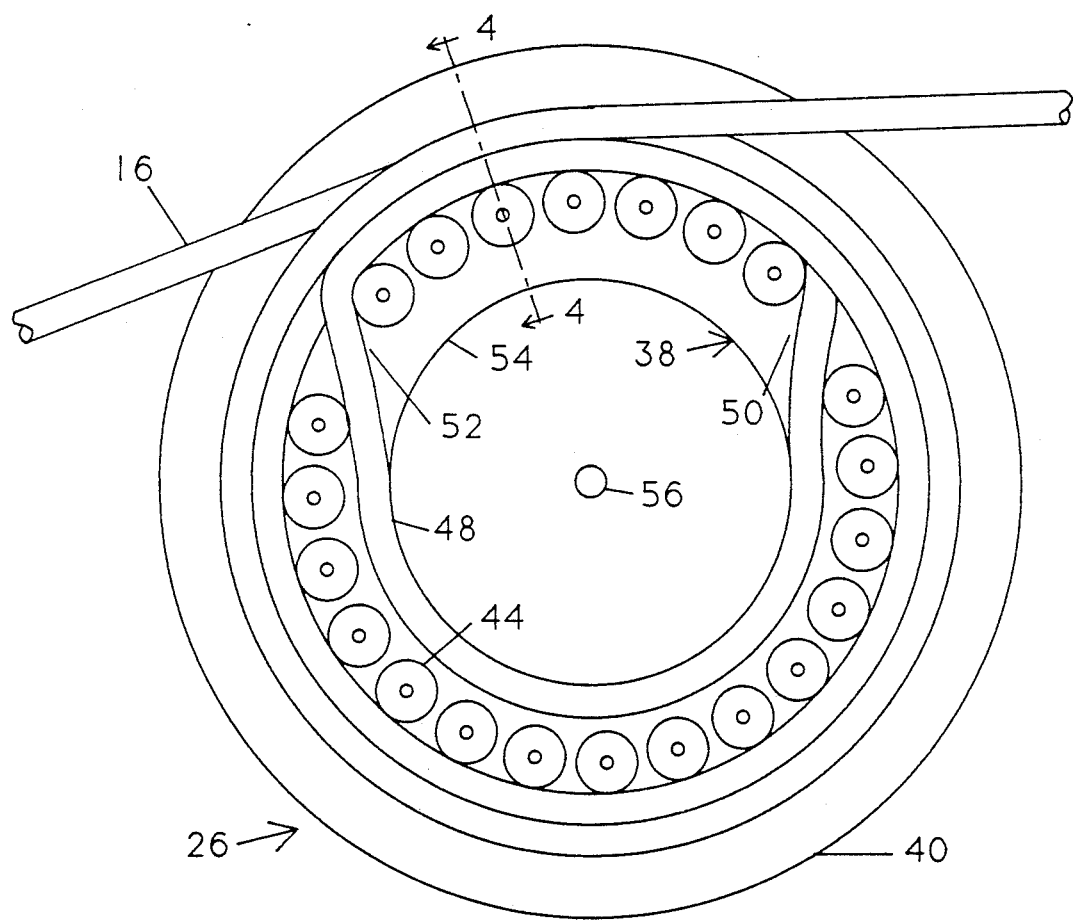
FIG. 3 is a side elevation of the apparatus according to the present invention with the near side member of the drum removed.
Figure 4:
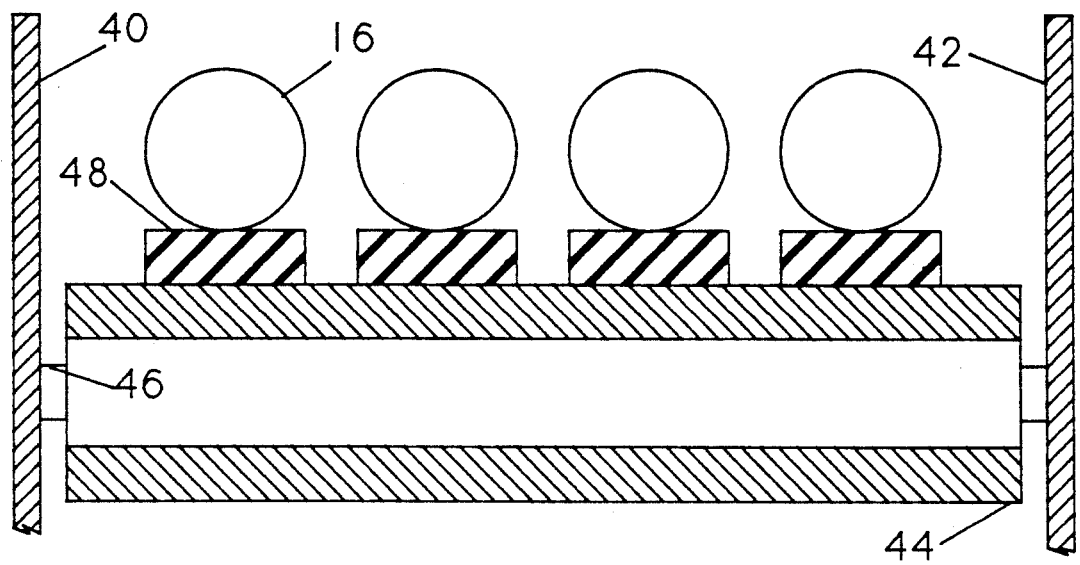
FIG. 4 is an enlarged detailed section through a segment of the present invention taken along line 4—4 of FIG. 3.

Turning now to FIGS. 3 and 4, a preferred embodiment of the subject strain relieving cable recovery device 26 is shown in greater detail. The device 26 has a drum assembly 38 formed by a pair of annular side flanges or plates 40,42 spaced apart by a plurality of rollers or sprocket members 44 each mounted on a respective shaft 46, the ends of which extend through or are mounted in the side flanges 40,42. An endless traction member 48 is mounted on the drum passing about the sprocket members 44 in a helical fashion forming at least two wraps about the exterior of the sprockets before entering and exiting the interior of the drum at 50,52, respectively, approximately on opposite sides of the drum assembly 38. A drive wheel 54 is mounted within the drum assembly 38 and preferably has outwardly directed sprocket teeth (not shown) adapted to engage and drive the endless traction member 48. The drive wheel 54 is preferably mounted on its drive shaft 56 on a bias in order to accommodate the offset of the traction member 48 as it exits and enters the interior of the drum from opposite sides thereof following its helical path. The drive shaft 56 is connected to any known drive means (not shown) such as an electrical or hydraulic motor with or without a transmission means (also not shown) as necessary.

FIG. 4 shows how the cable 16 will be wrapped around the drum assembly 38 and will be driven by the endless traction member 48 in a helical path moving, in this case, from right to left as the cable progresses clockwise around the drum assembly. The endless traction member 48 can be a roller chain of the type used with heavy equipment and which will provide a sort of self-centering configuration for the cable as it rides thereon.

Figure 5:
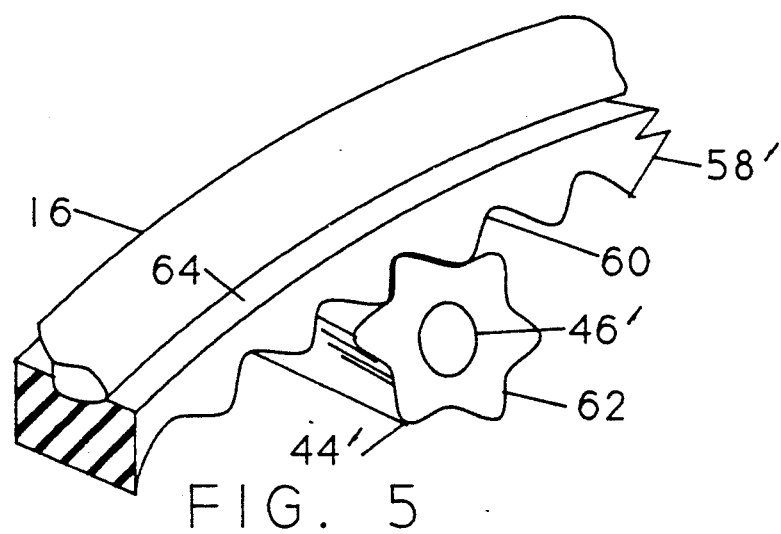
FIG. 5 is an enlarged detailed perspective of a segment of the present invention showing alternative construction.

FIG. 5 shows an alternate embodiment of the present invention in which the sprocket members 44 engage a traction member 58 which has a bottom surface 60 formed with a sinusoidal configuration adapted to engage with and be gripped by the teeth 62 of the individual sprocket members 42 and an upper surface 64 which is preferably slightly v-shaped in section to assure the centering of the cable 16 thereon.

It should also be noted that it would be possible to use simply rollers in place of the sprocket members if desired. In either case the rollers or sprocket members are preferably free-wheeling, rather than driven, so their exterior configuration is not all that important.

The subject invention works on the principle of a cathead in that the more wraps of cable around the drum assembly, the more it will pull without the cable slipping. The track that the traction member travels around the drum will move the cable along a helical path from one side of the drum to the other without the cable having to slide or twist as it would have to on a cathead.

The endless traction member 48 preferably runs on sprocket members 44 that are mounted on shafts 46, although any other suitable support for the endless traction member could likewise be used. The sprocket members are preferably relatively small in diameter and are placed close together so as to reduce cable flexing as it moves from one sprocket to another. The drive wheel 54 is preferably as large as the annular space within the drum assembly 38 allows, but it is also within the purview of the skilled mechanic to move the drive wheel 54 exteriorly of the drum assembly 38 without departing from the spirit or essential characteristics of the invention. The drive wheel 54 shown is on a slant so that one side will line up with the first wrap and the opposite side will line up with the last wrap of the traction member. The drive means for this drive wheel 54 can be any of the well-known electrical or electromechanical drive means or even internal combustion engine means. The only requirement is that the drive means must be suitable for use in a marine environment.

The endless traction member 48 of the present invention can be of any of the known means such as a roller chain or flexible belt. In either case it is preferable that the upper or outer surface of the endless traction member have a profile which aids in centering the cable thereon.

The theory of operation of the present invention is an analog of a band brake. The governing equation is
$T_1 = T_2 \times E^{\mu\theta}$
where $T_1$ is the tension of the cable going into the water, $T_2$ is the tension of the cable going on to the storage reel.

$\mu$ is the coefficient of friction between the cable and the endless traction means of the present invention.

$\theta$ is the degrees of wrap in radians.

For example, if we have four wraps, the tension on the cable going to the storage reel is $T_2 = 500$ ftlbs and the coefficient of friction $\mu = 0.1$, then the device is capable of pulling $T_1 = 500 \times E^{(01)4(2\pi)} = 6173$ ftlbs. Should we attempt to pull more than this value with these parameters, we would likely experience cable slippage. Changing the coefficient of friction slightly makes a tremendous difference in the pulling capability. Other important parameters are the diameter of the present invention and the length of cable to be wrapped thereabout.

The present invention may be subject to many changes and modifications without departing from the spirit or essential characteristics thereof. The present embodiment is therefore to be considered in all respects as illustrative and not restrictive as to the scope of the invention as defined by the appended claims.

I claim:

1. A strain relieving device for recovering cables having a plurality of spaced rigid cylindrical portions hampering conventional reeling, said device comprising:

a drum assembly having a pair of like generally circular side members in parallel spaced relationship, and a plurality of rotating members each mounted on a respective one of a like plurality of shafts mounted on and extending between said side members, said shafts being in parallel spaced relationship and located spaced inwardly of the circumference of said side members, a first pair of said rotating members and corresponding shafts on a first side of said drum assembly and a second pair of said rotating members and corresponding shafts on an opposite side of said drum assembly having a different spacing between each other than between each of the remaining rotating members and corresponding shafts;

endless traction means passing about said drum assembly in helical fashion forming at least two wraps around said drum assembly and passing between said first pair of rotating members and corresponding shafts into the enclosed space of said drum assembly bounded by said rotating members and corresponding shafts and said side members, forming at least part of a loop, and exiting between said second pair of rotating members and corresponding shafts; and drive means engaging said at least part of a loop of said endless traction means within said enclosed space to drive said endless traction means so that a cable to be recovered is passed engages said endless traction means and is pulled thereby about the circumference of said drum assembly in at least two wraps and pulled with uniform force and without rolling and/or twisting motion being imparted to the cable.

2. A strain relieving cable recovery device according to claim 1 wherein said rotating members are freely rotatable rollers.

3. A strain relieving cable recovery device according to claim 1 wherein said rotating members are freely rotatable sprockets.

4. A strain relieving cable recovery device according to claim 1 wherein said endless traction means is a reenforced belt having a first inner or lower surface profiled for engagement with said rotating members and a second outer or upper opposite surface profiled for guiding the cable substantially centrally of the endless traction means.

5. A strain relieving cable recovery device according to claim 1 wherein said drive means comprises a drive wheel within said drum assembly and adapted to engage and drive said endless traction means.

6. A strain relieving cable recovery device according to claim 5 wherein said drive wheel is mounted within said drum assembly with the axis of the former at an angle with respect to the axis of the latter to readily engage said traction means towards one side member of said drum assembly and release it on toward the opposite side member of said drum assembly.

* * * * *